(12) United States Patent
Baird

(10) Patent No.: US 11,519,454 B2
(45) Date of Patent: Dec. 6, 2022

(54) HYBRID METALLIC/COMPOSITE TUBE DESIGN TO TRANSFER BENDING, AXIAL, AND FLEXURAL SHEAR

(71) Applicant: GOODRICH CORPORATION, Charlotte, NC (US)

(72) Inventor: Bradley William Baird, Grimsby (CA)

(73) Assignee: Goodrich Corporation, Charlotte, NC (US)

( * ) Notice: Subject to any disclaimer, the term of this patent is extended or adjusted under 35 U.S.C. 154(b) by 702 days.

(21) Appl. No.: 16/520,968

(22) Filed: Jul. 24, 2019

(65) Prior Publication Data

US 2021/0025526 A1 Jan. 28, 2021

(51) Int. Cl.
*F16C 7/02* (2006.01)
*F16D 1/06* (2006.01)
B29L 31/06 (2006.01)
F16D 1/064 (2006.01)

(52) U.S. Cl.
CPC ............... *F16C 7/02* (2013.01); *F16D 1/06* (2013.01); B29L 2031/06 (2013.01); F16C 7/026 (2013.01); F16C 2226/80 (2013.01); F16C 2240/40 (2013.01); F16C 2240/70 (2013.01); F16D 1/064 (2013.01)

(58) Field of Classification Search
CPC .... F16C 7/00; F16C 7/02; F16C 7/026; F16C 11/10; F16C 11/103; F16C 2226/80; F16C 2240/40; F16C 2240/70; F16D 1/06; F16D 1/064; B29L 2031/06
See application file for complete search history.

(56) References Cited

U.S. PATENT DOCUMENTS

| | | | | |
|---|---|---|---|---|
| 617,484 | A | * 1/1899 | Haskell | F16C 7/026 74/579 R |
| 4,353,268 | A | * 10/1982 | Picard | G05G 1/04 74/587 |
| 4,886,944 | A | * 12/1989 | Christopher | F16C 7/026 200/48 R |

(Continued)

FOREIGN PATENT DOCUMENTS

DE 889869 C * 9/1953
DE 3641632 A1 * 6/1988
(Continued)

OTHER PUBLICATIONS

European Patent Office, European Search Report dated Jul. 13, 2020 in Application No. 19215839.2.

*Primary Examiner* — Adam D Rogers
(74) *Attorney, Agent, or Firm* — Snell & Wilmer L.L.P.

(57) ABSTRACT

A tube arrangement includes a composite tube defining a centerline axis, wherein the composite tube comprises a proximal surface and a distal surface, and an end fitting comprising a first end disposed within the composite tube and a second end extending from the composite tube, wherein an outer surface of the end fitting defines a flared portion defining a terminus of the first end, a lobe portion disposed axially from the flared portion, and a terminating portion disposed axially from the lobe portion, the proximal surface conforms to a geometry of the outer surface of the end fitting, the lobe portion and the flared portion mechanically lock the end fitting to the composite tube to mitigate movement of the end fitting relative to the composite tube.

19 Claims, 3 Drawing Sheets

(56) References Cited

U.S. PATENT DOCUMENTS

| | | | |
|---|---|---|---|
| 5,227,208 A * | 7/1993 | Thongs, Jr. | F02K 9/343 |
| | | | 428/34.7 |
| 5,233,737 A * | 8/1993 | Policelli | F16L 47/16 |
| | | | 285/423 |
| 6,379,763 B1 * | 4/2002 | Fillman | F16C 7/026 |
| | | | 428/36.9 |
| 6,666,467 B2 * | 12/2003 | Bernhardt | F16C 11/0695 |
| | | | 280/93.51 |
| 7,335,108 B2 | 2/2008 | Lin et al. | |
| 7,419,435 B2 * | 9/2008 | Borges | F16C 3/023 |
| | | | 464/181 |
| 7,452,156 B2 * | 11/2008 | Kennedy | F16C 3/023 |
| | | | 403/309 |
| 7,731,593 B2 | 6/2010 | Dewhirst et al. | |
| 7,874,925 B2 | 1/2011 | Dewhirst | |
| 8,157,469 B2 * | 4/2012 | Kennedy | F16C 7/026 |
| | | | 403/309 |
| 8,876,614 B2 | 11/2014 | Nakamura et al. | |
| 9,056,431 B2 * | 6/2015 | Bond | B29C 70/30 |
| 9,091,387 B2 * | 7/2015 | Quintana Rio | B29C 33/485 |
| 9,180,631 B2 * | 11/2015 | Fisher, Jr. | B29C 45/14631 |
| 9,217,463 B2 | 12/2015 | Oessenich et al. | |
| 9,352,538 B1 * | 5/2016 | Olason | B29C 70/32 |
| 9,546,678 B2 * | 1/2017 | Wu | F16C 3/02 |
| 10,875,265 B2 * | 12/2020 | Baird | B29C 70/72 |
| 11,067,114 B2 * | 7/2021 | Bernard | F16C 3/026 |
| 2003/0086756 A1 * | 5/2003 | Trotter | B25B 23/0035 |
| | | | 403/293 |
| 2005/0067037 A1 * | 3/2005 | Salama | E21B 17/01 |
| | | | 138/143 |
| 2005/0199308 A1 * | 9/2005 | Swails | F16L 33/30 |
| | | | 138/109 |
| 2011/0192528 A1 * | 8/2011 | Kozaki | B29D 23/001 |
| | | | 156/173 |
| 2017/0015054 A1 | 1/2017 | Born et al. | |
| 2019/0120283 A1 | 4/2019 | Faulkner et al. | |
| 2021/0071707 A1 * | 3/2021 | Funck | B29D 99/0046 |

FOREIGN PATENT DOCUMENTS

| | | | |
|---|---|---|---|
| EP | 1798429 A1 * | 6/2007 | F16C 7/026 |
| GB | 2473007 | 3/2011 | |
| JP | 58096515 A * | 6/1983 | B29C 70/86 |
| WO | WO-2020164704 A1 * | 8/2020 | F16B 17/004 |

* cited by examiner

HYBRID METALLIC/COMPOSITE TUBE DESIGN TO TRANSFER BENDING, AXIAL, AND FLEXURAL SHEAR

FIELD

The present disclosure relates generally to joints, and more specifically to joints having composite components.

BACKGROUND

Conventional structural components, for example aircraft landing gear components, are typically made of metallic materials. These metallic components can be relatively heavy and costly. Substitution of metals with composites is one way to reduce the weight and cost of structural components. Among other challenges is implementation of strong joints for load transfer from composite elements to metallic parts. The composite elements are typically fabricated in the form of tubes and are capable of handling significant axial and bending loads under both tension and compression.

SUMMARY

A tube arrangement is disclosed, comprising a composite tube defining a centerline axis, wherein the composite tube comprises a proximal surface and a distal surface, and an end fitting comprising a first end disposed within the composite tube and a second end extending from the composite tube. An outer surface of the end fitting defines a flared portion defining a terminus of the first end, a lobe portion disposed axially from the flared portion, and a terminating portion disposed axially from the lobe portion. The proximal surface conforms to a geometry of the outer surface of the end fitting. The lobe portion and the flared portion mechanically lock the end fitting to the composite tube to mitigate movement of the end fitting relative to the composite tube.

In various embodiments, the lobe portion defines an annular ridge disposed around the end fitting.

In various embodiments, the annular ridge defines a first convex fitting surface.

In various embodiments, an annular groove is formed into the proximal surface of the composite tube, the annular groove receives the lobe portion.

In various embodiments, the annular groove defines a concave tube surface.

In various embodiments, an annular protrusion is formed into the proximal surface of the composite tube, the annular protrusion is in contact with the lobe portion and the flared portion.

In various embodiments, the annular protrusion defines a convex tube surface.

In various embodiments, the flared portion defines a second convex fitting surface.

In various embodiments, the terminating portion defines a concave fitting surface.

In various embodiments, the concave fitting surface is rounded.

In various embodiments, the composite tube terminates at the terminating portion.

In various embodiments, a combined axial length of the flared portion, the lobe portion, and the terminating portion is between one and three times the maximum diameter of the flared portion.

In various embodiments, the end fitting is monolithic.

A tube arrangement is disclosed, comprising a composite tube defining a centerline axis, wherein the composite tube comprises a proximal surface and a distal surface, and an end fitting comprising a first end disposed within the composite tube and a second end extending from the composite tube. An outer surface of the end fitting defines a flared portion defining a terminus of the first end, a lobe portion disposed axially from the flared portion, and a terminating portion disposed axially from the lobe portion, the terminating portion defines a second flared portion, the second flared portion defining a concave fitting surface, wherein the concave fitting surface is rounded, the composite tube terminates at the terminating portion, and the composite tube comprises a rounded, flared proximal surface terminating at the terminating portion.

In various embodiments, an axial length of the flared portion is between 0.3 and 0.7 times the maximum diameter of the flared portion.

In various embodiments, an axial length of the lobe portion is between 0.6 and 1.2 times the maximum diameter of the lobe portion.

In various embodiments, an axial length of the terminating portion is between 0.2 and 0.6 times the minimum diameter of the terminating portion.

In various embodiments, an axial length between a terminus of the end fitting and a terminus of the terminating portion is between one and three times the maximum diameter of the flared portion.

A method for manufacturing a tube arrangement is disclosed, comprising disposing a composite material about an end fitting to form a composite tube defining a centerline axis, wherein the composite tube comprises a proximal surface and a distal surface, and the end fitting comprises a first end disposed within the composite tube and a second end extending from the composite tube, wherein an outer surface of the end fitting defines a flared portion defining a terminus of the first end, a lobe portion disposed axially from the flared portion, and a terminating portion disposed axially from the lobe portion, the proximal surface conforms to a geometry of the outer surface of the end fitting, and the lobe portion and the flared portion mechanically lock the end fitting to the composite tube to mitigate movement of the end fitting relative to the composite tube.

In various embodiments, the composite tube terminates at the terminating portion.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
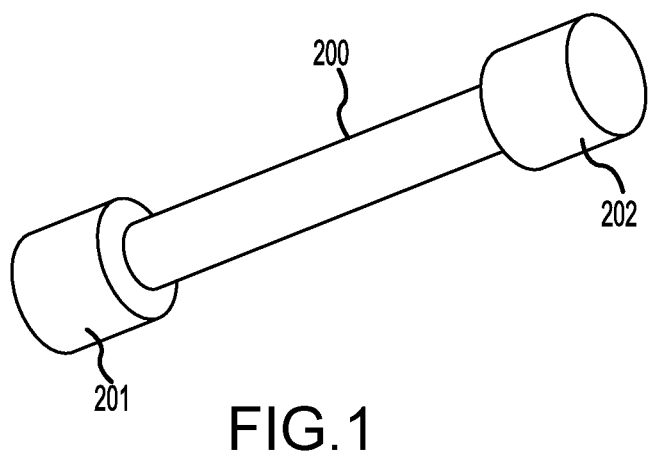
FIG. 1 illustrates a tube arrangement comprising hybrid metallic/composite tube joints at the ends thereof, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not for limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "distal" refers to the direction radially outward, or generally, away from the centerline axis of a tube. As used herein, "proximal" refers to a direction radially inward, or generally, towards the centerline axis of a tube.

As used herein, the term "concave surface" refers to a surface having an outline or periphery that curves inward like the interior of a circle or spheroid. As used herein, the term "convex surface" refers to a surface having an outline or periphery that curves outward like the exterior of a circle or spheroid.

The present disclosure describes composite tube arrangements having a composite tube and at least one end fitting. The end fitting may be made from a metallic material. A composite may comprise a polymer matrix composite. The composite may comprise a polymer matrix composite reinforced by fibers such as a carbon, glass, organic fibers, or combinations thereof. Such composite tube joints may be used in aircraft systems, such as, for example, landing gear systems. However, the systems and methods of the present disclosure may be suitable for use in non-aircraft systems as well.

A hybrid metallic/composite tube joint of the present disclosure may include an end of a composite tube and an end fitting. A composite tube joint may experience bending loads. Composite tube joints having a flared terminus, a lobe portion, and a terminating portion, of the present disclosure, may mitigate slipping of the composite tube with respect to the end fitting, and may reduce stress and flexural shear in the composite tube when under bending loads.

In various embodiments, a composite tube joint of the present disclosure may be useful for various components including, but not limited to, linkages, connecting rods, actuator rods, struts, structural supports, etc.

Figure 2:
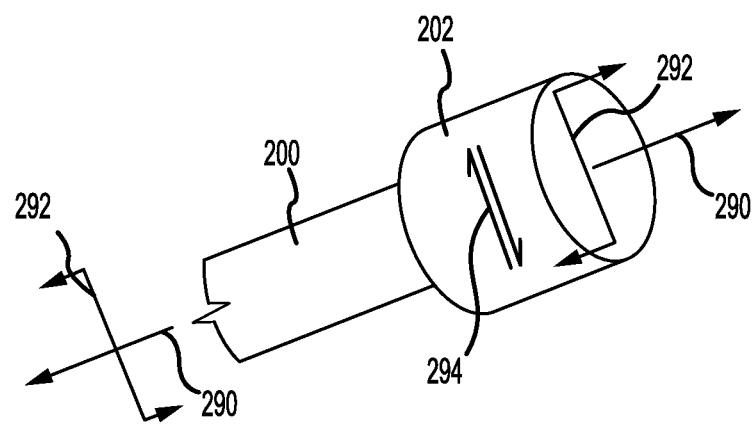
FIG. 2 illustrates a hybrid metallic/composite tube joint of the tube arrangement of FIG. 1 experiencing bending and axial loads, in accordance with various embodiments.

With reference to FIG. 1, a schematic view of a tube arrangement comprising a hybrid metallic/composite tube joint 201 and a hybrid metallic/composite tube joint 202 are illustrated, in accordance with various embodiments. Hybrid metallic/composite tube joint 201 and hybrid metallic/composite tube joint 202 may be disposed at either end of a composite tube 200. Although illustrated as having a hybrid metallic/composite tube joint 201 at a first end and a hybrid metallic/composite tube joint 202 at a second end, it is contemplated herein that composite tube 200 may comprise only one hybrid metallic/composite tube joint 201 at an end thereof. With additional reference to FIG. 2, hybrid metallic/composite tube joint 202 may experience an axial load, represented by arrows 290. The axial load may be a tensile load or a compressive load. Hybrid metallic/composite tube joint 202 may experience a bending moment, represented by arrows 292. Hybrid metallic/composite tube joint 202 may experience a flexural shear load, represented by arrows 294.

Figure 3A:
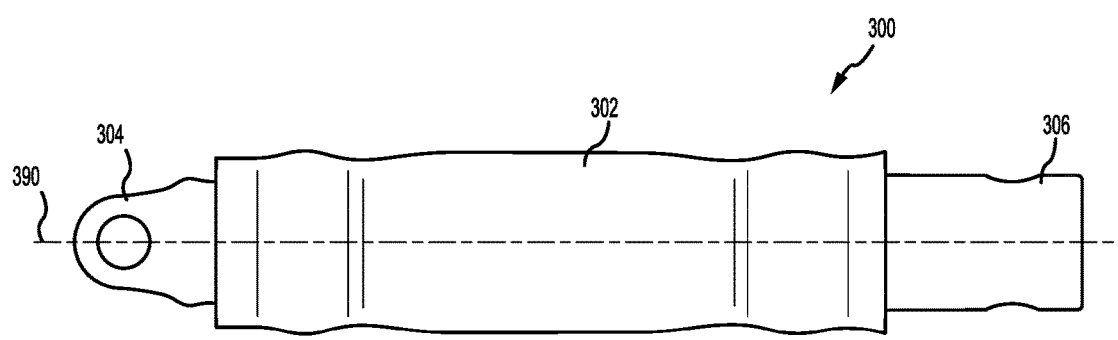
FIG. 3A illustrates a tube arrangement comprising hybrid metallic/composite tube joints at the ends thereof, in accordance with various embodiments.
Figure 3B:
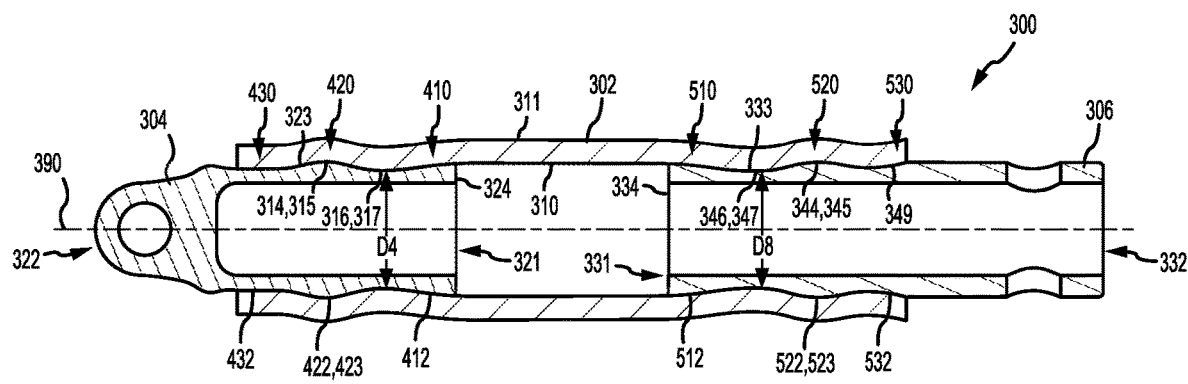
FIG. 3B illustrates a cross-section view of the tube arrangement of FIG. 3A, in accordance with various embodiments.

With combined reference to FIG. 3A and FIG. 3B, a tube arrangement 300 (also referred to herein as a hybrid metallic/composite tube arrangement) is illustrated, in accordance with various embodiments. Tube arrangement 300 generally comprises a composite tube 302 and at least one end fitting, such as end fitting 304 and/or end fitting 306. Composite tube 302 may define a centerline axis 390. Composite tube 302 and end fitting 304 may be coaxially disposed about centerline axis 390. Composite tube 302 and end fitting 306 may be coaxially disposed about centerline axis 390. Composite tube 302 may comprise a proximal surface 310 and a distal surface 311. A cross-section geometry (e.g., taken perpendicular to centerline axis 390) of composite tube 302 may be circular or may be non-circular (e.g., elliptical). Centerline axis 390 may be linear or may be non-linear.

In various embodiments, end fitting 304 and/or end fitting 306 are configured to couple composite tube 302 to an adjacent component. End fitting 304 and/or end fitting 306 may comprise any suitable attachment feature, including a lug, a clevis, a rod, or the like. In various embodiments, end fitting 304 and/or end fitting 306 are made from a metallic material. In various embodiments, end fitting 304 is formed as a single, monolithic piece. In various embodiments, end fitting 306 is formed as a single, monolithic piece. End fitting 304 and/or end fitting 306 may be configured to transfer loads (e.g., axial loads, bending loads, and/or flexural shear loads) between composite tube 302 and end fitting 304 and/or end fitting 306, respectively.

Figure 4:
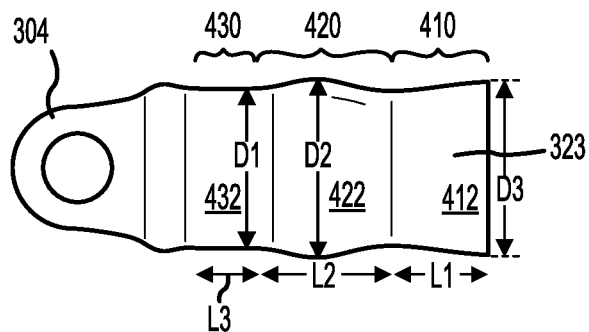
FIG. 4 illustrates a side view of an end fitting having a flared portion, a lobe portion, and a terminating portion, in accordance with various embodiments.
Figure 5:
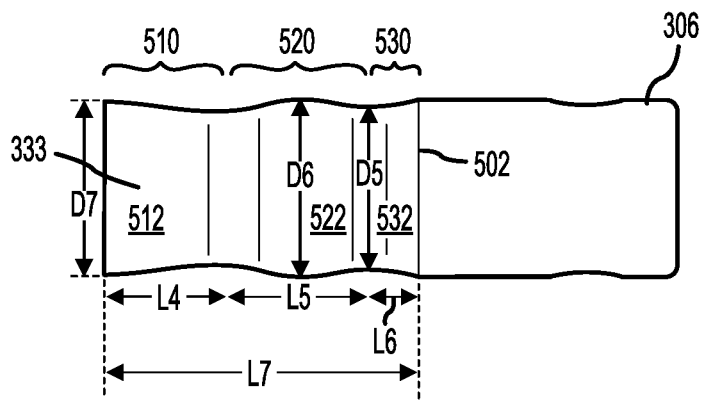
FIG. 5 illustrates a side view of an end fitting having a flared portion, a lobe portion, and a terminating portion, in accordance with various embodiments.

In various embodiments, end fitting 304 comprises a first end 321 disposed within composite tube 302 and a second end 322 extending from composite tube 302. With combined reference to FIG. 3B and FIG. 4, an outer surface 323 of end fitting 304 may define a flared portion (also referred to herein as a first flared portion) 410. Flared portion 410 may define a terminus 324 of first end 321. In various embodiments, flared portion 410 defines a convex surface 412 (also referred to herein as a second convex fitting surface). In this regard, flared portion 410 may be rounded or curved.

Outer surface 323 of end fitting 304 may define a lobe portion 420. Lobe portion 420 may be disposed axially from flared portion 410. Lobe portion 420 may be axially adjacent flared portion 410. In various embodiments, lobe portion 420 defines a convex surface 422 (also referred to herein as a first convex fitting surface). In this regard, lobe portion 420 may be rounded or curved. In various embodiments, lobe portion 420 defines an annular ridge 423 disposed perimetrically around the end fitting 304. The annular ridge 423 may define the convex surface 422.

Outer surface 323 of end fitting 304 may define a terminating portion 430. Terminating portion 430 may be disposed axially from lobe portion 420. Terminating portion 430 may be axially adjacent lobe portion 420. Lobe portion 420 may be disposed axially between terminating portion 430 and flared portion 410. Composite tube 302 may terminate at terminating portion 430. In various embodiments, terminating portion 430 defines a cylindrical surface 432. In this regard, terminating portion 430 may comprise a constant diameter, in accordance with various embodiments. In various embodiments, terminating portion 430 may be tapered.

Composite tube 302 may be formed around end fitting 304 in a known manner during manufacture of tube arrangement 300 using, for example, a filament winding process, and/or a resin film infusion process, among others. In this regard, composite tube 302 may comprise a fiber-reinforced polymer. The proximal surface 310 of composite tube 302 may conform to the geometry of outer surface 323 of end fitting 304. In this regard, an annular groove 314 may be formed into the proximal surface 310 of the composite tube 302. The annular groove 314 may define a concave surface 315 (also referred to herein as a concave tube surface). The annular groove 314 may receive the lobe portion 420. Furthermore, an annular protrusion 316 may be formed into the proximal surface 310 of the composite tube 302. The annular protrusion 316 may define a convex surface 317 (also referred to herein as a convex tube surface). The annular protrusion 316 may be in contact with the lobe portion 420 and the flared portion 410. Stated differently, the annular protrusion 316 may be partially formed by the lobe portion 420 and partially formed by the flared portion 410. Furthermore, the maximum diameter D1 of terminating portion 430 may be less than the maximum diameter D2 of lobe portion 420. Furthermore, the minimum inside diameter D4 of annular protrusion 316 may be less than the maximum outside diameter D3 of flared portion 410. In this manner, the lobe portion 420 and the flared portion 410, together with composite tube 302, mechanically lock the end fitting 304 to the composite tube 302 to mitigate movement of the end fitting 304 relative to the composite tube 302.

In various embodiments, the axial length L1 of flared portion 410 may be equal to between 0.3 and 0.7 times the maximum diameter D3 of flared portion 410. In various embodiments, the axial length L2 of lobe portion 420 may be equal to between 0.6 and 1.0 times the maximum diameter D2 of lobe portion 420. In various embodiments, the axial length L3 of terminating portion 430 may be equal to between 0.2 and 0.6 times the maximum diameter D1 of terminating portion 430.

In various embodiments, end fitting 306 may be similar to end fitting 304, except that the terminating surface of end fitting 306 comprises a flared portion defining a rounded, concave surface. In this manner, end fitting 306 may effectively transfer bending loads between end fitting 306 and composite tube 302, reducing the amount of stress at the terminus of composite tube 302. In this regard, end fitting 304 may be configured for applications where the bending moment is less dominant. Conversely, end fitting 306 may be configured for applications where the bending moment is more dominant.

In various embodiments, end fitting 306 comprises a first end 331 disposed within composite tube 302 and a second end 332 extending from composite tube 302. With combined reference to FIG. 3B and FIG. 4, an outer surface 333 of end fitting 306 may define a flared portion (also referred to herein as a first flared portion) 510. Flared portion 510 may define a terminus 334 of first end 331. In various embodiments, flared portion 510 defines a convex surface 512 (also referred to herein as a second convex fitting surface). In this regard, flared portion 510 may be rounded or curved.

Outer surface 333 of end fitting 306 may define a lobe portion 520. Lobe portion 520 may be disposed axially from flared portion 510. Lobe portion 520 may be axially adjacent flared portion 510. In various embodiments, lobe portion 520 defines a convex surface 522 (also referred to herein as a first convex fitting surface). In this regard, lobe portion 520 may be rounded or curved. In various embodiments, lobe portion 520 defines an annular ridge 523 disposed perimetrically around the end fitting 306. The annular ridge 523 may define the convex surface 522.

Outer surface 333 of end fitting 306 may define a terminating portion 530. Terminating portion 530 may be disposed axially from lobe portion 520. Terminating portion 530 may be axially adjacent lobe portion 520. Lobe portion 520 may be disposed axially between terminating portion 530 and flared portion 510. Composite tube 302 may terminate at terminating portion 530. In various embodiments, terminating portion 530 is flared outward (i.e., away from centerline axis 390). In this regard, terminating portion 530 may be referred to herein as a flared portion or a second flared portion. In various embodiments, terminating portion 530 defines a concave surface 532 (also referred to herein as a concave fitting surface). In this regard, terminating portion 530 may be rounded or curved, in accordance with various embodiments. In this manner, the terminus of composite tube 302 which terminates at terminating portion 530 may comprise a rounded, flared proximal surface 349 conforming to the geometry of terminating portion 530.

Composite tube 302 may be formed around end fitting 306 in a known manner during manufacture of tube arrangement 300 using, for example, a filament winding process, and/or a resin film infusion process, among others. The proximal surface 310 of composite tube 302 may conform to the geometry of outer surface 333 of end fitting 306. In this regard, an annular groove 344 may be formed into the proximal surface 310 of the composite tube 302. The annular groove 344 may define a concave surface 345 (also referred to herein as a concave tube surface). The annular groove 344 may receive the lobe portion 520. Furthermore, an annular protrusion 346 may be formed into the proximal surface 310 of the composite tube 302. The annular protrusion 346 may define a convex surface 347 (also referred to herein as a convex tube surface). The annular protrusion 346 may be in contact with the lobe portion 520 and the flared portion 510. Stated differently, the annular protrusion 346 may be partially formed by the lobe portion 520 and partially formed by the flared portion 510. Furthermore, the minimum diameter D5 of terminating portion 530 may be less than the maximum diameter D6 of lobe portion 520. Furthermore, the minimum inside diameter D8 of annular protrusion 346 may be less than the maximum outside diameter D7 of flared portion 510. In this manner, the lobe portion 520 and the flared portion 510, together with composite tube 302, mechanically lock the end fitting 306 to the composite tube 302 to mitigate movement of the end fitting 306 relative to the composite tube 302.

In various embodiments, the axial length L4 of flared portion 510 may be equal to between 0.3 and 0.7 times the maximum diameter D7 of flared portion 510. In various embodiments, the axial length L5 of lobe portion 520 may be equal to between 0.6 and 1.2 times the maximum diameter D6 of lobe portion 520. In various embodiments, the axial length L6 of terminating portion 530 may be equal to between 0.2 and 0.6 times the minimum diameter D5 of terminating portion 530. In various embodiments, the total combined axial length L7 of flared portion 410, lobe portion 420, and terminating portion 430 may be between 1 and 3 times the maximum diameter D7 of flared portion 510 ($1 \leq L7/D7 \leq 3$). Stated differently, the axial length L7 between terminus 334 (see FIG. 3B) and the end 502 of terminating portion 530 may be between 1 and 3 times the maximum diameter D7 of flared portion 510. In various embodiments, the total combined axial length L7 of flared portion 410, lobe portion 420, and terminating portion 430 may be between 1.4 and 2 times the maximum diameter D7 of flared portion 510 ($1.4 \leq L7/D7 \leq 2$).

Figure 6:
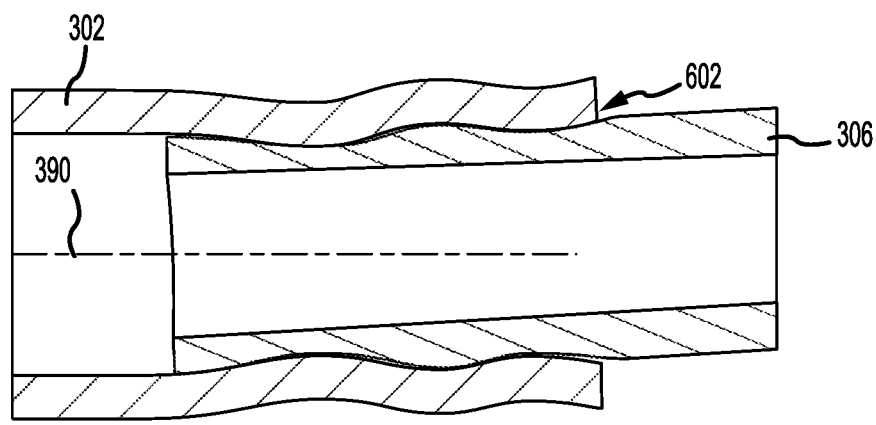
FIG. 6 illustrates a cross-section view of a hybrid metallic/composite tube joint experiencing a bending load, in accordance with various embodiments.

With reference to FIG. 6, end fitting 306 and composite tube 302 are illustrated experiencing combined axial, bending, and flexural loads. End fitting 306 may effectively transfer these loads between end fitting 306 and composite tube 302, reducing the amount of stress around the terminus 602 of composite tube 302 due to the shape of end fitting 306 at and around terminus 602.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A tube arrangement, comprising:
    a composite tube defining a centerline axis, wherein the composite tube comprises a proximal surface and a distal surface; and
    an end fitting comprising a first end disposed within the composite tube and a second end extending from the composite tube;
    wherein an outer surface of the end fitting defines a flared portion defining a terminus of the first end, a lobe portion disposed axially from the flared portion, and a terminating portion disposed axially from the lobe portion, the terminating portion defines a second flared portion, the second flared portion defining a concave fitting surface, wherein the concave fitting surface is rounded, the composite tube terminates at the terminating portion, and the composite tube comprises a rounded, flared proximal surface terminating at the terminating portion.

2. The tube arrangement of claim 1, wherein an axial length of the flared portion is between 0.3 and 0.7 times a maximum diameter of the flared portion.

3. The tube arrangement of claim 1, wherein an axial length of the lobe portion is between 0.6 and 1.2 times a maximum diameter of the lobe portion.

4. The tube arrangement of claim 1, wherein an axial length of the terminating portion is between 0.2 and 0.6 times a minimum diameter of the terminating portion.

5. The tube arrangement of claim 1, wherein an axial length between a terminus of the end fitting and a terminus of the terminating portion is between one and three times a maximum diameter of the flared portion.

6. A tube arrangement, comprising:
    a composite tube defining a centerline axis, wherein the composite tube comprises a proximal surface and a distal surface; and
    an end fitting comprising a first end disposed within the composite tube and a second end extending from the composite tube;
    wherein an outer surface of the end fitting defines a flared portion defining a terminus of the first end, a lobe portion disposed axially from the flared portion, and a terminating portion disposed axially from the lobe portion, the proximal surface conforms to a geometry of the outer surface of the end fitting, the lobe portion and the flared portion mechanically lock the end fitting to the composite tube to mitigate movement of the end fitting relative to the composite tube, the lobe portion defines an annular ridge disposed around the end fitting, the annular ridge is oriented orthogonal with respect to the centerline axis.

7. The tube arrangement of claim 6, wherein the annular ridge defines a first convex fitting surface.

8. The tube arrangement of claim 1, wherein an annular groove is formed into the proximal surface of the composite tube, the annular groove receives the lobe portion.

9. The tube arrangement of claim 8, wherein the annular groove defines a concave tube surface.

10. The tube arrangement of claim 1, wherein an annular protrusion is formed into the proximal surface of the composite tube, the annular protrusion is in contact with the lobe portion and the flared portion.

11. The tube arrangement of claim 10, wherein the annular protrusion defines a convex tube surface.

12. The tube arrangement of claim 11, wherein the terminating portion defines a concave fitting surface.

13. The tube arrangement of claim 12, wherein the concave fitting surface is rounded.

14. The tube arrangement of claim 13, wherein the composite tube terminates at the terminating portion.

15. The tube arrangement of claim 1, wherein the flared portion defines a second convex fitting surface.

16. The tube arrangement of claim 1, wherein a combined axial length of the flared portion, the lobe portion, and the terminating portion is between one and three times a maximum diameter of the flared portion.

17. The tube arrangement of claim 1, wherein the end fitting is monolithic.

18. A method for manufacturing a tube arrangement, comprising:

disposing a composite material about an end fitting to form a composite tube defining a centerline axis;

wherein the composite tube comprises a proximal surface and a distal surface, and the end fitting comprises a first end disposed within the composite tube and a second end extending from the composite tube;

wherein an outer surface of the end fitting defines a flared portion defining a terminus of the first end, a lobe portion disposed axially from the flared portion, and a terminating portion disposed axially from the lobe portion;

the proximal surface conforms to a geometry of the outer surface of the end fitting; and the lobe portion and the flared portion mechanically lock the end fitting to the composite tube to mitigate movement of the end fitting relative to the composite tube, the lobe portion defines an annular ridge disposed around the end fitting, the annular ridge is oriented orthogonal with respect to the centerline axis.

19. The method of claim 18, wherein the composite tube terminates at the terminating portion.

* * * * *